(12) United States Patent
Blättler et al.

(10) Patent No.: US 10,449,992 B2
(45) Date of Patent: Oct. 22, 2019

(54) STEERING COLUMN HAVING AN ELECTRO-MECHANICAL FIXING DEVICE

(71) Applicants: THYSSENKRUPP PRESTA AG, Eschen (LI); thyssenkrupp AG, Essen (DE)

(72) Inventors: Simon Blättler, Altstätten (CH); Jean-pierre Specht, Sennwald (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 125 days.

(21) Appl. No.: 15/736,004

(22) PCT Filed: Jun. 13, 2016

(86) PCT No.: PCT/EP2016/063434
§ 371 (c)(1),
(2) Date: Dec. 13, 2017

(87) PCT Pub. No.: WO2016/202715
PCT Pub. Date: Dec. 22, 2016

(65) Prior Publication Data
US 2018/0170419 A1 Jun. 21, 2018

(30) Foreign Application Priority Data
Jun. 19, 2015 (DE) .................. 10 2015 007 784

(51) Int. Cl.
*B62D 1/184* (2006.01)
*B62D 1/187* (2006.01)
(Continued)

(52) U.S. Cl.
CPC ............. *B62D 1/184* (2013.01); *B62D 1/187* (2013.01); *F16B 1/00* (2013.01); *F16B 2001/0064* (2013.01); *F16H 19/001* (2013.01)

(58) Field of Classification Search
CPC . B62D 1/184; B62D 1/187; F16B 1/00; F16B 2001/0064; F16H 19/001
See application file for complete search history.

(56) References Cited

U.S. PATENT DOCUMENTS 6,237,438 B1 * 5/2001 Ben Rhouma ......... B62D 1/184
74/492
8,056,437 B2 * 11/2011 Rouleau ................. B62D 1/187
74/493
(Continued)

FOREIGN PATENT DOCUMENTS

CN 102099238 A 6/2011
CN 203005507 U 6/2013
(Continued)

OTHER PUBLICATIONS

English translation of International Search Report issued in PCT/EP2016/063434 dated Jul. 14, 2016 (dated Jul. 21, 2016).
(Continued)

*Primary Examiner* — Darlene P Condra
(74) *Attorney, Agent, or Firm* — thyssenkrupp North America, Inc.

(57) ABSTRACT

An adjustable steering column may include a casing tube that rotatably supports a steering spindle, a holding part that has two lateral cheeks between which the casing tube is positioned, and an electromechanical fixing device. In a release position of the fixing device, the casing tube may be adjustable relative to the holding part. In a fixing position, a set position of the casing tube may be fixed relative to the holding part. The fixing device may include a clamping bolt that passes through the lateral cheeks and is rotatable about its axis by an electric motor positioned in a housing as the fixing device is opened and closed, a cam mechanism, and a support bearing. The lateral cheeks and the casing tube may be positioned between the cam mechanism and the
(Continued)

support bearing. A first cam disk of the cam mechanism may rotate with the clamping bolt, and a second cam disk may be guided on the clamping bolt so as to be axially movable in the housing. The housing may be mounted in a floating manner on the second cam disk.

10 Claims, 5 Drawing Sheets

(51) Int. Cl.
*F16B 1/00* (2006.01)
*F16H 19/00* (2006.01)

(56) References Cited

U.S. PATENT DOCUMENTS

| | | | | |
|---|---|---|---|---|
| 2004/0000779 | A1* | 1/2004 | Armstrong | B62D 1/184 280/775 |
| 2005/0097978 | A1* | 5/2005 | Ben Rhouma | B62D 1/184 74/492 |
| 2009/0007612 | A1* | 1/2009 | Laval | B60R 25/02142 70/271 |
| 2011/0167948 | A1* | 7/2011 | Andrearczyk | B62D 1/181 74/493 |
| 2012/0312626 | A1* | 12/2012 | Hosomi | B62D 1/189 180/443 |
| 2015/0375769 | A1* | 12/2015 | Abboud | B62D 1/181 74/493 |

FOREIGN PATENT DOCUMENTS

| | | |
|---|---|---|
| CN | 104053587 A | 9/2014 |
| DE | 10240267 C | 11/2003 |
| DE | 69919639 T | 9/2005 |
| DE | 60305795 T | 5/2007 |
| DE | 10 2006 034 714 A | 1/2008 |
| DE | 102008016742 A | 11/2009 |
| DE | 102008029247 A | 12/2009 |
| DE | 102012101494 B | 5/2013 |
| DE | 102012007005 A | 10/2013 |
| DE | 102012111890 A | 12/2013 |
| DE | 102012024037 B | 1/2014 |
| DE | 102013001442 A | 3/2014 |
| DE | 102014016510 A | 2/2015 |
| DE | 102014102661 A | 4/2015 |
| EP | 0606085 A | 7/1994 |
| FR | 2687628 A | 8/1993 |
| WO | 2009/153166 A | 12/2009 |

OTHER PUBLICATIONS

English abstract of DE60305795T.
English abstract of DE10240267C.
English abstract of DE102008016742A.
English abstract of DE69919639T.
English abstract of FR2687628A.
English abstract of EP0606085A.

* cited by examiner

STEERING COLUMN HAVING AN ELECTRO-MECHANICAL FIXING DEVICE

CROSS REFERENCE TO RELATED APPLICATIONS

This application is a U.S. National Stage Entry of International Patent Application Serial Number PCT/EP2016/063434, filed Jun. 13, 2016, which claims priority to German Patent Application No. DE 10 2015 007 784.8, filed Jun. 19, 2015, the entire contents of both of which are incorporated herein by reference.

FIELD

The present disclosure generally relates to steering columns, including adjustable steering columns for motor vehicles having electromechanical fixing devices.

BACKGROUND

Adjustable steering columns are used to adapt the position of the steering wheel to the seating position of the driver and are known in various embodiments. In many motor vehicles, the vertical slope of the steering column and/or the distance between the steering wheel and the driver can be adjusted. After the steering column has been adjusted, it is fixed in the desired position. For this purpose, a large number of clamping mechanisms for axially and/or vertically adjustable steering columns of motor vehicles are known. Since a high force is required to lock the clamping mechanism, despite the use of lever elements, there is the need for an electrically actuable steering column mechanism.

French Laid-Open Application FR 2 687 628 A1 discloses a clamping mechanism which can be activated by means of an electric actuating element. The steering column is fixed in a particular position selected by the driver by means of the clamping mechanism. A clamping member that can be actuated by the electric actuating element holds the clamping mechanism in a clamping position. When the electric actuating element is activated by the driver, the clamping member is moved from its clamping position into a non-clamping position, with the result that the clamping mechanism is deactivated and the steering column is thus movable relative to the attachment fixed to the vehicle. For example, the driver presses a button, which activates an electric motor to cancel the clamping of the steering wheel. The motor drives the clamping member, which is thereby moved into the non-clamping position.

Also known from the prior art is DE 603 05 795 T2, which discloses electric clamping for a steering column, wherein the clamping device is mounted on the steering column by means of a mounting rod or a mounting hoop. One disadvantage of this solution is the complex construction of the clamping device and the resulting restricted modularity.

Furthermore, DE 699 19 639 T2 discloses an electric clamping mechanism, wherein a movable cam disk is mounted for conjoint rotation on a worm wheel, and a cam disk which is immovable in respect of rotation is fixed on the housing by means of a seating plate. The disadvantage here is the high number of components and the associated costs.

Thus a need exists for an adjustable steering column having an electromechanical fixing device, which has an uncomplicated and compact construction and, at the same time, is inexpensive.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A steering column for a motor vehicle, which is adjustable in at least the longitudinal direction thereof or in the vertical direction thereof, may include, at least in some examples, a casing tube, which rotatably supports a steering spindle, a holding part, which can be connected to the body of the motor vehicle and has two lateral cheeks, between which the casing tube is arranged, and an electromechanical fixing device, in the release position of which the casing tube can be adjusted relative to the holding part at least in the longitudinal direction of the steering column and in the fixing position of which the set position of the casing tube is fixed relative to the holding part, wherein the fixing device comprises a clamping bolt, which passes through the lateral cheeks of the holding part and can be rotated about its axis by means of an electric motor arranged in a housing as the fixing device is opened and closed, and a stroke-generating mechanism and a support bearing, wherein the lateral cheeks of the holding part and the casing tube are arranged between the stroke-generating mechanism and the support bearing, wherein the stroke-generating mechanism has two stroke-generating disks, wherein a first stroke-generating disk is connected for conjoint rotation to the clamping bolt and a second stroke-generating disk is guided on the clamping bolt in such a way as to be axially movable in the housing, and wherein the housing is mounted in a floating manner on the second stroke-generating disk. This construction is particularly compact and inexpensive since it is possible to dispense with additional fastening points for attaching the fixing device to the steering column.

"In a floating manner" is taken to mean that the housing is supported against rotation about the longitudinal axis of the clamping bolt but can be moved relative to the second stroke-generating disk in the direction of the longitudinal axis of the clamping bolt without tilting in the process.

In a preferred development, the stroke-generating mechanism is designed as a cam mechanism, wherein the first stroke-generating disk is designed as a first cam disk and the second stroke-generating disk is designed as a second cam disk. By means of relative rotation of the first and of the second cam disk, a stroke is produced. Such cam gears are sufficiently well known from the prior art. For this reason, a precise description of this cam mechanism will not be given at this point.

In a preferred development, at least one rolling element is arranged between the first cam disk and the second cam disk. This rolling element is preferably designed as a roller, needle or ball. This rolling element rolls between the cam disks, thus making it possible to reduce the friction during operation.

In another preferred development, at least two pins are arranged between the first stroke-generating disk and the second stroke-generating disk, wherein these pins can be transferred from a sloping position into a horizontal position by the rotation of the first stroke-generating disk relative to the second stroke-generating disk, starting from the release position and moving to the fixing position. Such "tilting-pin stroke-generating mechanisms" are known from the prior art. A stroke is generated by the tilting of the pins. The pins preferably comprise two rounded heads, wherein the first head is accommodated in a first pocket of the first stroke-generating disk and the second head is accommodated in a second pocket of the second stroke-generating disk.

In a preferred embodiment, a guide clamp is provided, which is arranged between the holding part and the casing tube and guides the casing tube in the longitudinal direction. It is advantageous here if the guide clamp is supported in the holding part in such a way as to be pivotable about a pivoting axis and thus allows vertical adjustment of the steering column.

A rotor shaft of the electric motor is preferably connected for conjoint rotation to a worm, wherein the worm meshes with a worm wheel, which is connected for conjoint rotation to the first stroke-generating disk.

The worm wheel preferably has a base surface of a circle sector. The base surface of the worm wheel is arranged orthogonally to an axis about which the worm wheel at least partially rotates.

It is not necessary to construct the worm wheel as a complete worm wheel since it does not perform a complete rotation but only rotates through an angle of less than 360°, preferably less than 90° and very particularly preferably less than 55°.

The two stroke-generating disks preferably interact as a stroke-generating gear with the support bearing to provide a clamping stroke for the fixing position of the fixing device.

It is furthermore preferred that, in addition to the electric motor, the worm gear is also accommodated in the housing, and the housing is secured on a lateral cheek of the holding part. The housing can thus move with the lateral cheek.

In an advantageous embodiment, a tension spring is arranged between the housing and the worm wheel, said tension spring being provided as a closing aid for the fixing device and being pre-tensionable by rotation of the worm wheel when the fixing device is transferred to the release position. The tension spring assists the electric motor during the transition to the fixing position, making it possible to use a less powerful and less expensive electric motor without extending the closing time.

In another embodiment, provision can be made for there to be at least one fixing hook arranged between the lateral cheeks of the holding part and adjustable by means of the rotation of the clamping bolt as the fixing device is opened and closed, said fixing hook engaging in a mating fixing part in the fixing position and being spaced apart from the mating fixing part in the release position, wherein the mating fixing part is arranged on or formed by an outer wall of the casing tube which is parallel to the axis of the clamping bolt. This fixing device provides an additional holding force against longitudinal adjustment of the steering column in the event of an accident involving the vehicle.

The casing tube outer wall parallel to the axis of the clamping bolt is also taken to mean a circular-cylindrical outer wall of the casing tube since this casing tube has a tangent which is aligned parallel to the axis of the clamping bolt.

It is furthermore preferred to arrange a fixing disk between the second stroke-generating disk and the lateral cheek of the holding part which is close to said disk, the fixing disk being connected substantially for conjoint rotation to the second stroke-generating disk and forming a movement lock in the direction of vertical adjustment in conjunction with the lateral cheek of the holding part in the fixing position of the fixing device.

Connected substantially for conjoint rotation should be understood to mean that the fixing disk and the second stroke-generating disk are connected to one another with little play (less than ±10°).

The second stroke-generating disk preferably has a circular main body with two radially projecting attachments, wherein these attachments form the axial guide for the second cam disk and the floating support for the housing in conjunction with a corresponding recess in the housing.

The radially projecting attachments can preferably have a dovetail profile, wherein they are accommodated in the corresponding recess in the housing in a manner which prevents relative rotation but allows translation. Good support and easy movement in the housing can be achieved by means of the dovetail profile.

Figure 1:
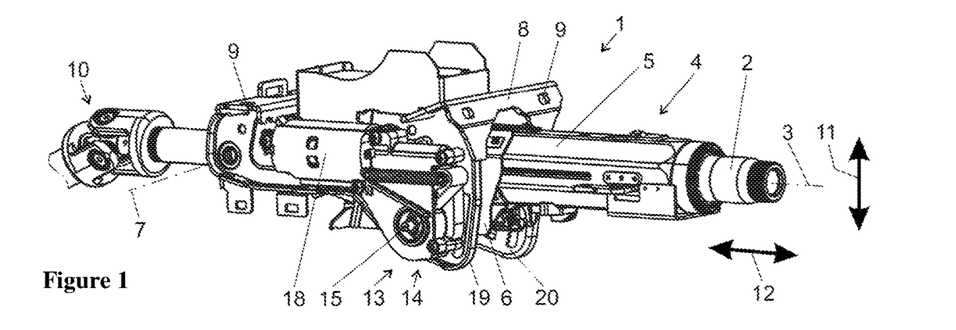
FIG. 1 is a perspective view of an example steering column having an example electromechanical fixing device in a fixing position.

FIG. 1 illustrates a steering column 1, which comprises a steering spindle 2, which is supported by means of a casing tube 5 in a steering spindle bearing unit 4 in such a way as to be rotatable about its axis of rotation 3. The casing tube 5 is guided in a guide clamp 6 in such a way as to be movable along the longitudinal axis of the steering spindle 2. The guide clamp 6 is supported in a bracket or, in general terms, a holding part 8 in such a way as to be pivotable about a pivoting axis 7. The holding part 8 can be secured at securing points 9 on the body (not shown) of a motor vehicle. The rotary motion introduced into the steering spindle 2 by a driver via a steering wheel (not shown) is introduced into the steering gear (not shown) via a universal joint 10 and further steering shaft parts. To increase the comfort of the driver, the steering column 1 can be adjusted in height in a first direction of adjustment, also referred to as the vertical direction 11, and in length in a second direction of adjustment, also referred to as the longitudinal direction 12. For this purpose, a fixing device 13 is provided, which comprises a clamping apparatus 14.

The clamping apparatus 14 has a clamping bolt 15, a stroke-generating mechanism 16, a support bearing 17 and an electric motor 18. By rotation of the clamping bolt 15 in this embodiment, two cams of the stroke-generating mechanism 16 are rotated relative to one another, and the lateral cheeks 19, 20 of the holding part 8 are pulled together, thereby giving rise to nonpositive clamping of the lateral cheeks 19, 20 of the holding part 8 to the lateral surfaces of the guide clamp 6 and, in turn, to the lateral surfaces of the casing tube 5.

The clamping bolt 15 passes through slotted holes in the lateral cheeks 19, 20 of the holding part 8 and holes in the lateral surfaces of the guide clamp 6. The cam mechanism 16 is arranged on the end of the clamping bolt 15 adjacent to the electric motor, and the support bearing 17 is arranged on the other end of the clamping bolt 15. The lateral cheeks 19, 20 and the lateral surfaces as well as the casing tube 5 are arranged between the cam mechanism 16 and the support bearing 17.

By rotating the clamping bolt 15, the fixing device can be switched selectively into a release position, also referred to as the open position, or into a fixing position, also referred to as the closed position. In the release position, the position of the steering spindle 2 or of the steering wheel secured thereon (not shown in the figures) can be moved, in particular, in the longitudinal direction and the vertical direction or direction of the slope. In the fixing position of the fixing device 13, the steering column 1 is fixed in position.

Figure 2:
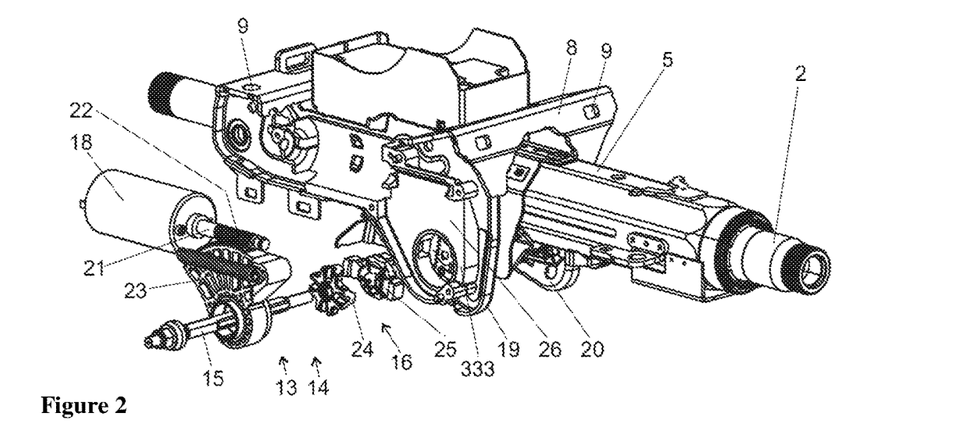
FIG. 2 is an exploded view of an example fixing device without a housing cover.
Figure 3:
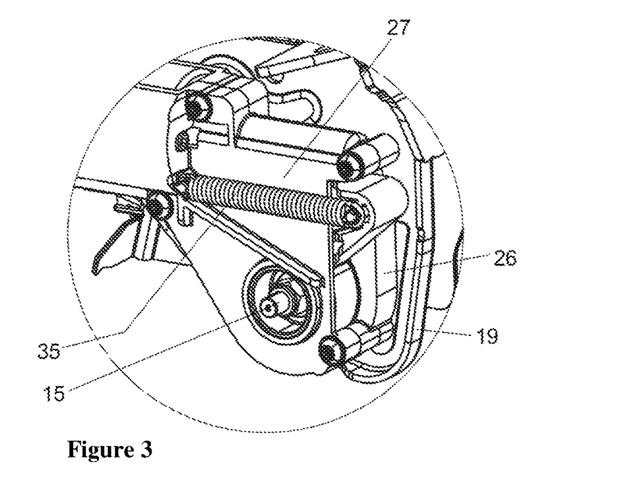
FIG. 3 is a perspective detail view of an example fixing device.

In FIG. 2, the electromechanical fixing device 13 is shown in detail in an exploded view. It comprises the electric motor 18, the rotor shaft 21 of which is connected for conjoint rotation to a worm 22. The worm 22 meshes with a worm wheel 23, which is connected for conjoint rotation to a first cam disk 24 and interacts with a second cam disk 25 as a stroke-generating gear for the provision of a clamping stroke. The electric motor 18 and a gear consisting of worm 22 and worm wheel 23 are arranged in a housing 26, which is secured pivotably on the lateral cheeks 19 of the holding part 8, and is covered with respect to the outside by a housing cover 27, as illustrated in FIG. 3.

Figure 4:
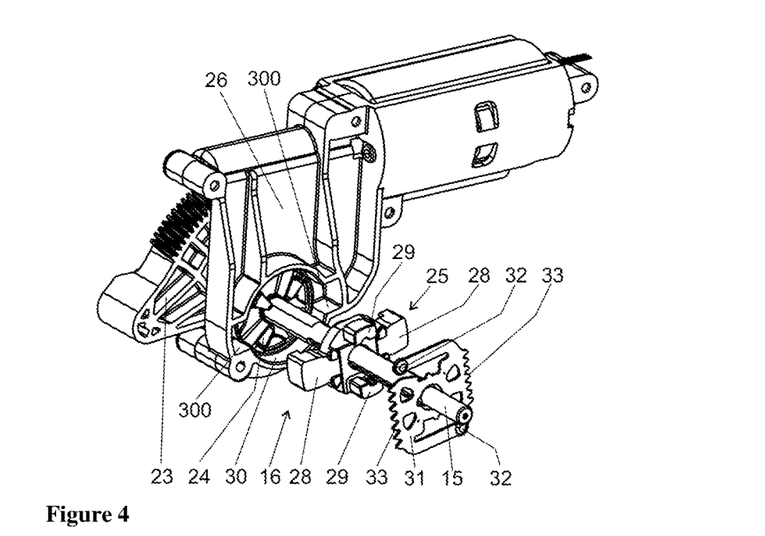
FIG. 4 is a perspective view of an example fixing device.

The stroke-generating mechanism 16 is shown in detail in FIG. 4. The second cam disk 25 has two attachments 28, which project radially from a substantially round basic shape and are situated diametrically opposite one another, and two projections 29, which project in the direction of the guide clamp 6. The housing 26 has an aperture 30 for passing through the clamping bolt 15, said aperture being shaped in such a way that it forms a guide 300 for the second cam disk 25 exclusively in the axial direction. Rotation of the second cam disk 25 with the clamping bolt 15 is thus excluded. The housing 26 of the electromechanical fixing device 13 is supported in a floating manner on the second cam disk 25 and can move axially on the clamping bolt 15 and the second cam disk 25 during the transfer between the fixing position and the release position.

Figure 5:
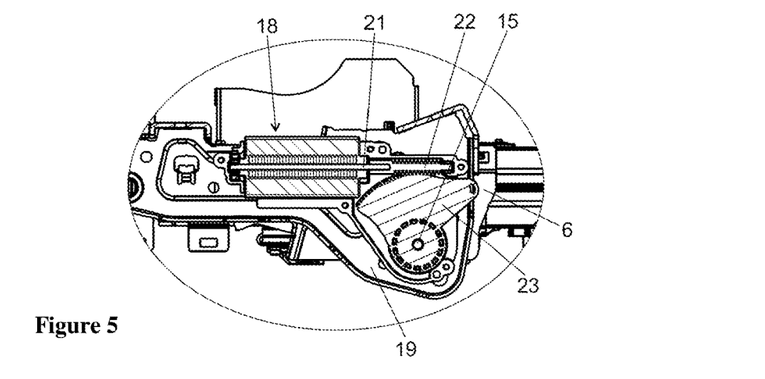
FIG. 5 is a longitudinal sectional view of an example fixing device.

Moreover, a fixing disk 31 is provided, which is arranged on the clamping bolt 15 between the second cam disk 25 and the holding part 8 and, in the clamped state, engages in a set of teeth 333 on the holding part 8 by means of two toothed sides 33 in order to secure the position of the housing 26 in the holding part 8 in the direction of vertical adjustment. For this purpose, the fixing disk 31 is seated for conjoint rotation on the projections 29 of the second cam disk 25. In order to move the fixing disk 31 out of engagement during transfer into the release position, the fixing disk 31 comprises two leaf-spring-type legs 32. FIG. 5 shows in detail how the rotor shaft 21 of the electric motor 18 is connected for conjoint rotation to the worm 22. In this case, the rotor shaft 18 and the worm 22 are arranged perpendicularly to the clamping bolt 15. The worm 22 meshes with the worm wheel 23 in the form of a circle sector, which rotates about the axis of rotation of the clamping bolt 15.

Figure 6:
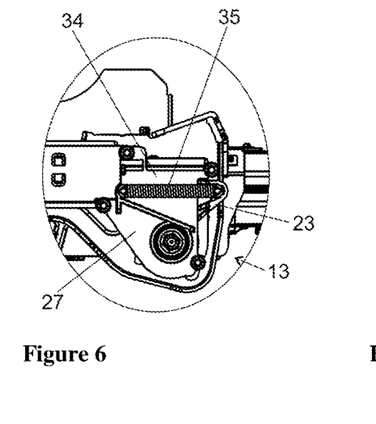
FIG. 6 is a side detail view of an example fixing device in a fixing position.
Figure 7:
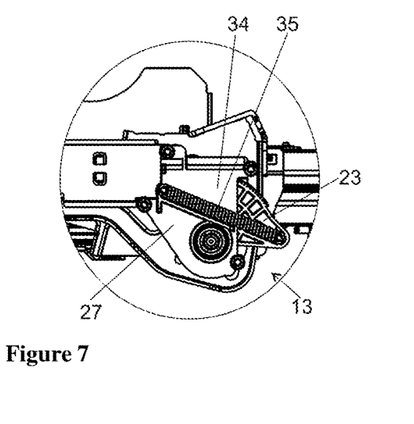
FIG. 7 is a side detail view of an example fixing device in a release position.

FIGS. 6 and 7 illustrate an advantageous embodiment of the steering column 1 according to the invention with a closing aid 34 for the fixing device 13. A spiral tension spring 35 is arranged between the housing 27 and the worm wheel 23. As the fixing device is transferred into the release position, the tension spring 35 is pre-tensioned by rotation of the worm wheel 23 together with the clamping bolt 15. The energy stored in the tension spring 35 is available to transfer the device into the fixing position and thus assists the electric motor 18 in closing the fixing device 13. As a result, a less powerful and less expensive electric motor 18 can be used without extending the closing time. Arranged within the tension spring 35 is a foam body 351, which damps the vibrations of the tension spring and thus mitigates troublesome noises due to the vibration of the tension spring 35.

Figure 8:
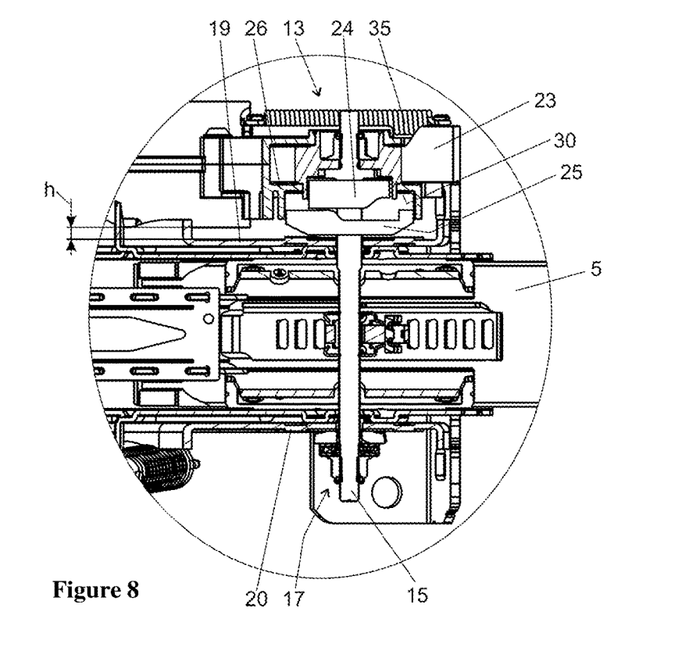
FIG. 8 is a longitudinal sectional view of an example steering column in a fixed state with an example stroke-generating mechanism in a first embodiment.
Figure 9:
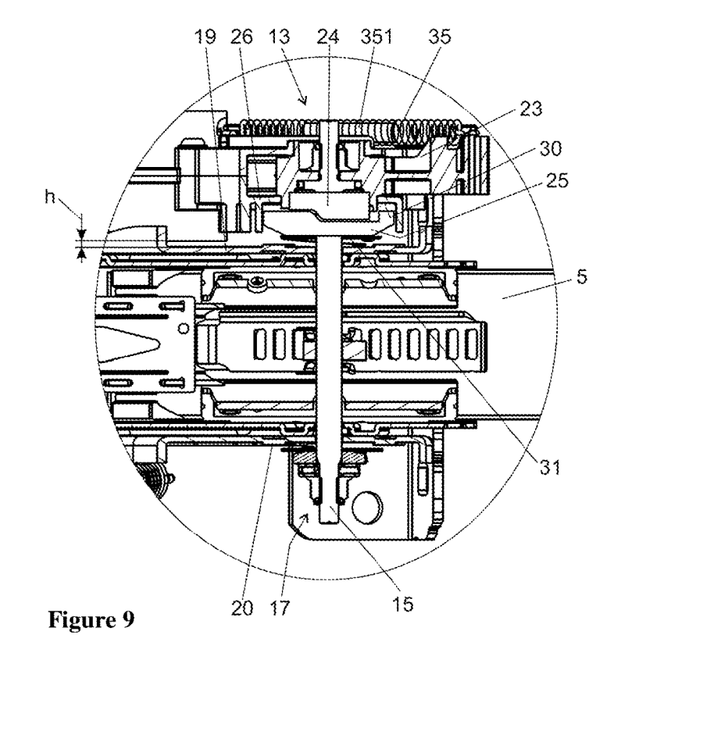
FIG. 9 is a longitudinal sectional view of the example steering column in a released state with the stroke-generating mechanism in the first embodiment.

The operation of the fixing device 13 with a stroke-generating mechanism 16 in a first embodiment is illustrated in FIGS. 8 and 9 in the form of a longitudinal section through the steering column 1. FIGS. 8 and 9 concern a simplified schematic illustration to increase clarity. Owing to the rotation of the clamping bolt 15, the first cam disk 24 connected for conjoint rotation thereto is rotated relative to the second cam disk 25. Due to the interaction between the two cam disks 24, 25, the distance between the worm wheel 23 and the casing tube 5 changes. During the transfer to the fixing position, the distance is increased inasmuch as the two cam disks 24, 25 are moved apart by rotation and hence the depth of the two components increases, with the result that the second cam disk 25 is pushed out of the aperture 30 in the housing 26 and is supported on the lateral cheek 19 of the holding part 8 and, in the process, pulls the support bearing 17 toward the opposite lateral cheek 20 of the holding part 8. During this process, the fixing disk 31 is pushed into an aperture in the holding part 8. The fixing device is now clamped in such a way that the lateral cheeks 19, 20 of the holding part 8 are pulled together, as a result of which there is nonpositive clamping of the lateral cheeks 19, 20 of the holding part 8 to the lateral surfaces of the guide clamp 6 and, in turn, to the lateral surfaces of the casing tube 5. The clearance h between the fixing device 13 has a higher value in the fixing position than in the release position since the lateral cheeks 19, 20 are pulled together.

During the transfer into the release position, the first cam disk 24 is rotated relative to the second cam disk 25 until the two components engage in one another and the depth thereof is reduced. As a result, the second cam disk 25 moves axially in the housing 26 in the direction of the worm wheel 23, and the support bearing 17 and the fixing disk 31 are released from the lateral cheeks 19, 20 of the holding part 8 by means of the two leaf-spring-type legs 32. The clamping of the fixing device 13 is thus released and the steering column 1 is released for adjustment.

Figure 10:
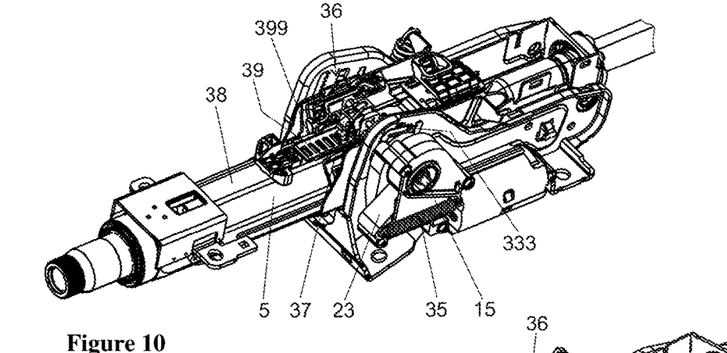
FIG. 10 is a perspective view of an example steering column from below with an example fixing hook in a fixing position.
Figure 11:
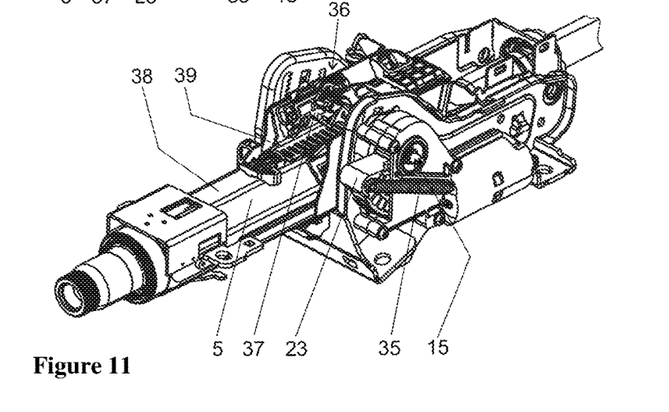
FIG. 11 is a perspective view of the steering column of FIG. 10 with the fixing hook in a release position.

FIG. 10 shows the fixing position and FIG. 11 shows the release position of the steering column 1 in a perspective view. In the figures, a fixing device 36 is particularly clearly visible in addition to the fixing device 13 described above, said fixing device 36 being used to apply an additional holding force to counter a longitudinal movement of the steering column 1 in the event of an accident involving the vehicle.

A fixing hook 37 is arranged on the clamping bolt 15, and a mating fixing element 39 is arranged on the upper side wall 38 of the casing tube 5 lying parallel to the axis of the clamping bolt 15. The mating fixing element 39 has a plurality of engagement elements 399, which follow one another at uniform intervals in the longitudinal direction of the steering column and are provided for positive engagement of the fixing hook 37. During the opening and closure of the fixing device 13, the clamping bolt 15 is rotated about its axis and, together with it, the fixing hook 37. In the open state, the release position, the fixing hook 37 is at a distance from the mating fixing element 39 and, in the closed state, the fixing position, of the fixing device, the fixing hook 37 is preferably in sprung contact with the mating fixing part 39. A fixing device 36 of this kind is known from German Patent DE 10 2008 016 742 B4.

Figure 12:
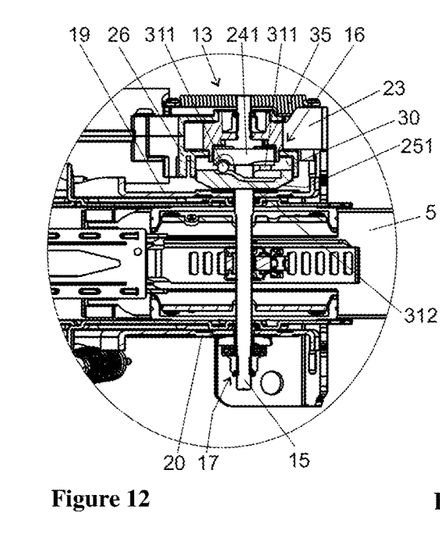
FIG. 12 is a longitudinal sectional view of an example steering column in a fixed state with an example stroke-generating mechanism in a second embodiment.
Figure 13:
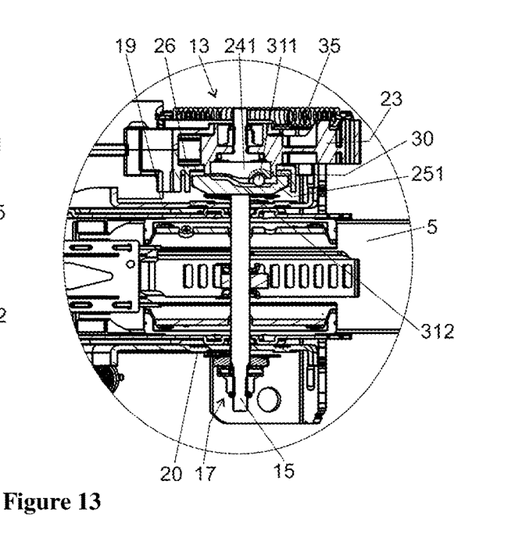
FIG. 13 is a longitudinal sectional view of the steering column in a released state with the stroke-generating mechanism in the second embodiment.

The operation of the fixing device 13 with a stroke-generating mechanism 16 in a third embodiment is illustrated in FIGS. 12 and 13 in the form of a longitudinal section. FIGS. 12 and 13 concern a simplified schematic illustration to increase clarity. The remainder of the steering column has an identical structure to the steering column 1 in FIGS. 1 to 11. By means of the rotation of the clamping bolt 15, a first stroke-generating disk 241 connected for conjoint rotation thereto is rotated relative to a second stroke-generating disk 251, wherein two rolling elements 311, which roll in races 312 formed in the second stroke-generating disk 251, are arranged between the stroke-generating disks 241, 251. The rolling elements 311 are furthermore accommodated in a pocket formed in the first stroke-generating disk 241. Due to the interaction of the two stroke-generating disks 241, 251, the distance between the worm wheel 23 and the casing tube 5 changes. During the transition to the fixing position, the distance is increased inasmuch as the two stroke-generating disks 241, 251 are moved apart by rotation and hence the depth of the two components increases, with the result that the second cam disk 251 is pushed out of the recess 30 in the housing 26 and the rolling elements 311 roll up the ramp of the race 312 and, during this process, is supported on the lateral cheek 19 of the holding part 8 and thereby pulls the support bearing 17 toward the opposite lateral cheek 20 of the holding part 8. The fixing device is now clamped in such a way that the lateral cheeks 19, 20 of the holding part 8 are pulled together, as a result of which there is nonpositive clamping of the lateral cheeks 19, 20 of the holding part 8 to the lateral surfaces of the guide clamp 6 and, in turn, to the lateral surfaces of the casing tube 5. During the transition into the release position, the first stroke-generating disk 24 is rotated relative to the second cam disk 25 until the rolling elements 311 have rolled down the ramp of the race 312. As a result, the second cam disk 25 moves axially in the housing 26 in the direction of the worm wheel 23 and of the support bearing 17. The clamping of the fixing device 13 is thus released and the steering column 1 is released for adjustment. A stroke-generating mechanism 16 of this kind with the stroke-generating disks 241, 251 and the rolling elements 311 is known from German Laid-Open Application DE 10 2008 029 247 A1, for example.

Figure 14:
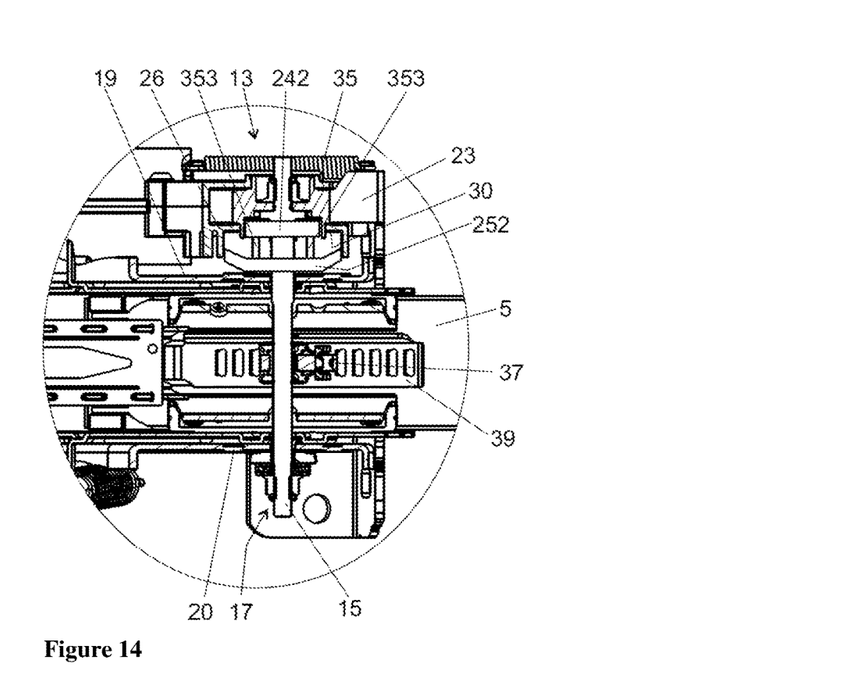
FIG. 14 is a longitudinal sectional view through an example steering column in a fixed state with an example stroke-generating mechanism in a third embodiment.
Figure 15:
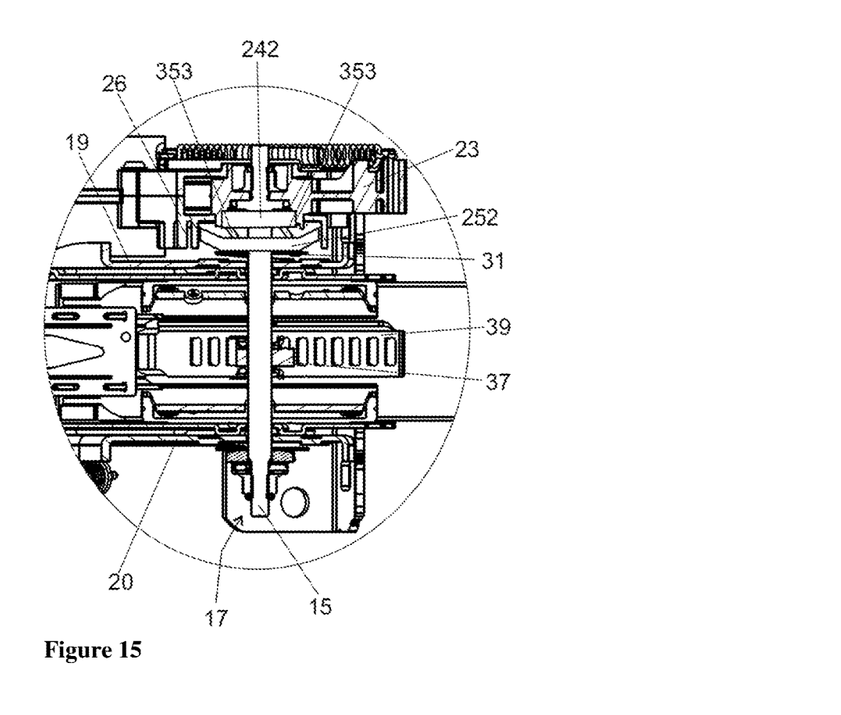
FIG. 15 is a longitudinal sectional view through the steering column in a released state with the stroke-generating mechanism in the third embodiment.

The operation of the fixing device 13 with a stroke-generating mechanism 16 in a second embodiment is illustrated in FIGS. 14 and 15 in the form of a longitudinal section. FIGS. 14 and 15 concern a simplified schematic illustration to increase clarity. The remainder of the steering column has an identical structure to the steering column 1 in FIGS. 1 to 11. By means of the rotation of the clamping bolt 15, a first stroke-generating disk 242 connected for conjoint rotation thereto is rotated relative to a second stroke-generating disk 252, wherein two pins 353, also referred to as tilting pins, which are supported in pockets in the respective stroke-generating disk 242, 252, are arranged between the stroke-generating disks 242, 252. Due to the interaction of the two stroke-generating disks 242, 252, the distance between the worm wheel 23 and the casing tube 5 changes. During the transition to the fixing position, the distance is increased inasmuch as the two stroke-generating disks 242, 252 are moved toward one another by rotation and, as a result, the pins 353 are transferred from a sloping position into a horizontal position. The stroke required for fixing is provided in this way. A stroke-generating mechanism 16 of this kind with the stroke-generating disks 242, 252 and the pins 353 is known from EP 0 606 085 B1, for example.

The adjustable steering column 1 according to the invention has an electromechanical fixing device 13 of particularly compact construction. Here, the housing 26, 27 of the fixing device 13 is supported in a floating manner on the second cam disk 25 and can move in the axial direction of the clamping bolt 15. There is thus no need for additional means of securing the housing 26, 27 on the body.

What is claimed is:

1. A steering column for a motor vehicle that is adjustable in at least one of a longitudinal direction or a vertical direction of the steering column, the steering column comprising:
   a casing tube that rotatably supports a steering spindle;
   a holding part that is connectable to a body of the motor vehicle and includes two lateral cheeks between which the casing tube is disposed;
   an electromechanical fixing device, wherein in a release position of the electromechanical fixing device the casing tube is adjustable relative to the holding part in the at least one of the longitudinal direction or the vertical direction of the steering column, wherein in a fixing position of the electromechanical device a set position of the casing tube is fixed relative to the holding part, the electromechanical fixing device comprising
      a clamping bolt that passes through the two lateral cheeks of the holding part and is rotatable about an axis of the clamping bolt by way of an electric motor disposed in a housing as the electromechanical fixing device is opened and closed; and
      a stroke-generating mechanism and a support bearing, wherein the two lateral cheeks of the holding part and the casing tube are disposed between the stroke-generating mechanism and the support bearing, wherein the stroke-generating mechanism comprises a first stroke-generating disk and a second stroke-generating disk, with the first stroke-generating disk being connected for conjoint rotation to the clamping bolt and the second stroke-generating disk being guided on the clamping bolt such that the second stroke-generating disk is axially movable in the housing, wherein the housing is mounted in a floating manner on the second stroke-generating disk.

2. The steering column of claim 1 further comprising a guide clamp that is disposed between the holding part and the casing tube, wherein the guide clamp guides the casing tube in the longitudinal direction of the steering column.

3. The steering column of claim 2 wherein the guide clamp is supported in the holding part such that the guide clamp is pivotable about a pivoting axis.

4. The steering column of claim 3 further comprising a fixing disk disposed between the second stroke-generating disk and the lateral cheek of the holding part that is closest to the second stroke-generating disk, the fixing disk being connected substantially for conjoint rotation to the second stroke-generating disk and forming a movement lock in the vertical direction of the steering column in conjunction with the lateral cheek closest to the second stroke-generating disk in the fixing position of the fixing device.

5. The steering column of claim 1 wherein a rotor shaft of the electric motor is connected for conjoint rotation to a worm, wherein the worm meshes with a worm wheel that is connected to conjoint rotation to the first stroke-generating disk.

6. The steering column of claim 5 further comprising a tension spring disposed between the housing and the worm wheel, wherein the tension spring is a closing aid for the electromechanical fixing device and is pre-tensionable by rotation of the worm wheel when the electromechanical fixing device is transferred to the release position.

7. The steering column of claim 1 wherein the first and second stroke-generating disks interact as a stroke-generating gear with the support bearing to provide a clamping stroke for the fixing position of the electromechanical fixing device.

8. The steering column of claim 7 wherein the stroke-generating gear is disposed in the housing, wherein the housing is secured on one of the two lateral cheeks of the holding part.

9. The steering column of claim 1 further comprising a fixing hook that is disposed between the two lateral cheeks of the holding part and is adjustable by rotation of the clamping bolt as the electromechanical fixing device is opened and closed, the fixing hook engaging in a mating fixing part in the fixing position and being spaced apart from the mating fixing part in the release position, wherein the mating fixing part is disposed on or formed by a wall of the casing tube that is parallel to the axis of the clamping bolt.

10. The steering column of claim 1 wherein the second stroke-generating disk has a circular main body with two projecting attachments, wherein the two projecting attachments form an axial guide for the second stroke-generating disk in conjunction with a corresponding recess in the housing.

* * * * *